United States Patent
Noble

(10) Patent No.: US 12,478,476 B2
(45) Date of Patent: Nov. 25, 2025

(54) ORBITAL FLOOR IMPLANT

(71) Applicant: Poriferous, LLC, Newnan, GA (US)

(72) Inventor: Aaron Noble, Newnan, GA (US)

(73) Assignee: PORIFEROUS, LLC., Newnan, GA (US)

( * ) Notice: Subject to any disclaimer, the term of this patent is extended or adjusted under 35 U.S.C. 154(b) by 889 days.

(21) Appl. No.: 17/594,890

(22) PCT Filed: May 1, 2020

(86) PCT No.: PCT/US2020/031050
§ 371 (c)(1),
(2) Date: Nov. 2, 2021

(87) PCT Pub. No.: WO2020/223641
PCT Pub. Date: Nov. 5, 2020

(65) Prior Publication Data
US 2022/0202575 A1    Jun. 30, 2022

Related U.S. Application Data

(60) Provisional application No. 62/841,969, filed on May 2, 2019.

(51) Int. Cl.
*A61F 2/28* (2006.01)
*A61B 17/80* (2006.01)
(Continued)

(52) U.S. Cl.
CPC ........ *A61F 2/2875* (2013.01); *A61B 17/8061* (2013.01); *A61B 17/8085* (2013.01);
(Continued)

(58) Field of Classification Search
CPC .......... A61F 2/2875; A61F 2/2846; A61F 2002/2878; A61F 2002/30578;
(Continued)

(56) References Cited

U.S. PATENT DOCUMENTS

| | | | |
|---|---|---|---|
| 9,993,337 B1 * | 6/2018 | Brogan | A61F 2/2875 |
| 2006/0116682 A1 | 6/2006 | Longo | |
| 2015/0320561 A1 * | 11/2015 | Noble | A61F 2/2846 |
| | | | 623/17.18 |

FOREIGN PATENT DOCUMENTS

| | | |
|---|---|---|
| EP | 3437589 A1 | 2/2019 |
| WO | 2004093743 A1 | 11/2004 |

(Continued)

OTHER PUBLICATIONS https://cmf.stryker.com/assets/files/3c/cmf-fl-6-medpor-titan-brand-yellow.pdf (Year: 2016).*
(Continued)

*Primary Examiner* — Jerrah Edwards
*Assistant Examiner* — Jose H. Trevino, III
(74) *Attorney, Agent, or Firm* — Kilpatrick Townsend & Stockton, LLP

(57) ABSTRACT

Embodiments of the present disclosure relate generally to an orbital floor implant (10). One embodiment provides an implant with a first surface that is a fully porous, bone-side layer (16) and a second surface that is a non-porous, orbital content-side layer (18). The implant material itself may be polymeric material throughout, without the need for an embedded mesh or other support matrix. The implant is provided in a pre-shaped configuration and is of a material that allows it to be bent for shaping purposes. An extending tab (12) with eyelet portion/opening (14) can enhance securement options to a patient's bone.

7 Claims, 5 Drawing Sheets

(51) Int. Cl.
*A61B 17/86* (2006.01)
*A61F 2/30* (2006.01)

(52) U.S. Cl.
CPC ............ *A61B 17/86* (2013.01); *A61F 2/2846* (2013.01); *A61F 2002/2878* (2013.01); *A61F 2002/30578* (2013.01)

(58) Field of Classification Search
CPC .............. A61F 2/30734; A61F 2/30942; A61F 2002/2889; A61F 2002/30011; A61F 2002/3008; A61F 2250/0024; A61B 17/8061; A61B 17/8085; A61B 17/86
See application file for complete search history.

(56) References Cited

FOREIGN PATENT DOCUMENTS

| | | |
|---|---|---|
| WO | 2007142743 A2 | 12/2007 |
| WO | 2015053549 A1 | 4/2015 |

OTHER PUBLICATIONS

European Patent Application No. EP20727512.4 , Office Action dated Jul. 4, 2023, 6 pages.
PCT/US2020/031050, "International Search Report and Written Opinion", Oct. 5, 2020, 19 pages.
PCT/US2020/031050, "Invitation to Pay Additional Fees and, Where Applicable, Protest Fee", Aug. 11, 2020, 13 pages.
Australian Patent Application No. AU2020264509 , First Examination Report mailed May 21, 2024, 2 pages.

\* cited by examiner

| 3D Orbital Floor | | | | | | |
|---|---|---|---|---|---|---|
| Cat # | Description | A | B | C | D | E |
| 4452 | Small - Right | 30mm | 35mm | 13mm | 1mm | .4mm |
| 4453 | Small - Left | 30mm | 35mm | 13mm | 1mm | .4mm |
| 4456 | Large - Right | 34mm | 37.5mm | 16mm | 1mm | .4mm |
| 4457 | Large - Left | 34mm | 37.5mm | 16mm | 1mm | .4mm |

ORBITAL FLOOR IMPLANT

This application claims the benefit of U.S. Provisional Application Ser. No. 62/841,969, filed May 2, 2019 titled "Orbital Floor Implant," the entire contents of which are hereby incorporated by reference.

FIELD OF THE DISCLOSURE

Embodiments of the present disclosure relate generally to an orbital floor implant. One embodiment provides an implant with a first surface that is a fully porous, bone-side layer and a second surface that is a non-porous, orbital content-side layer. The implant material itself may be polymeric material throughout, without the need for an embedded mesh or other support matrix. The implant is provided in a pre-shaped configuration and is of a material that allows it to be bent for shaping purposes. An extending tab with eyelet portions can enhance securement options to a patient's bone.

BACKGROUND

The orbit is the boney socket in the skull that contains and houses the eye, along with the associated structures that support eye function, such as the eye muscles, nerves, and blood vessels. In some instances, a variety of problems can occur in the eye socket, ranging from inflammatory diseases or other diseases, tumors, infections, birth defects, or injuries from trauma. When these problems occur, it may become necessary to reconstruct various portions of the orbital socket, including the orbital floor.

Additionally problems associated with traditional titanium fixation plates extending from the orbital device are that they can be difficult to shape and trim. Cutting titanium results in sharp edges that, if not meticulously altered post-cutting by smoothing all cut edges, results in tissue and vascular damage. This damage in many cases can cause hematoma formation that requires medical intervention and/or device removal to correct. In the below disclosure, the polymeric extension tab serves as an alternative fixation method that, when trimmed, does not result in sharp edges, reducing the risk of the potential complications mentioned above.

Advances in bone and surgical technology have provided materials that may serve as a substitute for the patient's own tissue, when needed. These advances include titanium plates and screws, hydroxyapatite cement, porous polyethylene, and resorbable fixation devices. Improvements to orbital surgical implants and materials remain desirable.

BRIEF SUMMARY

Embodiments of the present disclosure provide an orbital floor implant. In one embodiment, the implant has a first surface that is a fully porous, bone-side layer. This porous layer/side encourages tissue ingrowth/stabilization, and may provide needed volume to restore the globe to the correct position. The implant has a second surface that is a non-porous, orbital content-side layer. The non-porous layer/side prevents tissue attachment and provides rigidity and malleability. These two layers may be heat laminated to one another in order to retain the connection therebetween, although it is understood that other connection options are possible and considered within the scope of this disclosure. The implant further provides a tab that assists with securement to the patient's bone.

In one example, there is provided an orbital floor implant comprising, an implant body defined by a porous side and a non-porous side, the non-porous side extending from the body to form an extension tab with one or more eyelet openings, a curved transition portion between the porous side and the non-porous side. The implant may be of a polyethylene material with a total implant thickness of about 1 mm. The porous side may be about 0.6 mm, and the porous side is about 0.4 mm. The extension tab may have a thickness of about 0.4 mm. The implant may have an upper curvature shaped to correspond to an orbital opening. The material forming the non-porous side that is blended with a radio opaque substance such as barium metal powder in order to provide surgeon with feedback of implant position post-surgery via CT or MRI. In use, the non-porous extension tab provides clamping force, and the porous side includes the transition that functions as a supporting beam providing shear force and supporting the remainder of the implant body/loaded beam.

DETAILED DESCRIPTION

Figure 1:
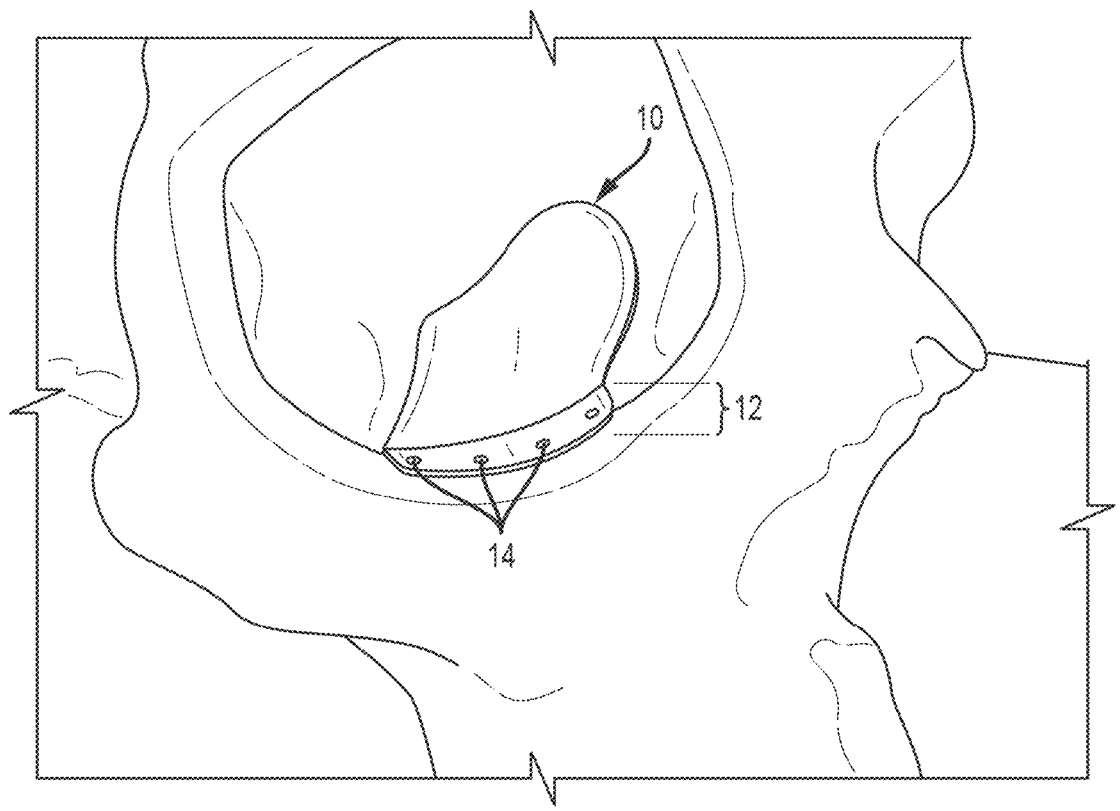
FIG. 1 shows a perspective view of an orbital floor implant positioned with respect to a patient's orbital bone.

FIG. 1 illustrates an implant 10 positioned with respect to a patient's orbital bone. An extending tab 12 is secured to the patient's inferior orbital rim in use. The tab 12 may have a plurality of eyelets or openings 14 that allow its securement (via one or more screws) to the patient's bone. Although not shown, the tab 12 may also have additional or multiple rows of eyelets or openings to allow for more inferior screw placement, if desired by the surgeon. The openings 14 are generally sized to receive a screw such that the screw sits flush with respect to the implant/tab surface.

Figure 2:
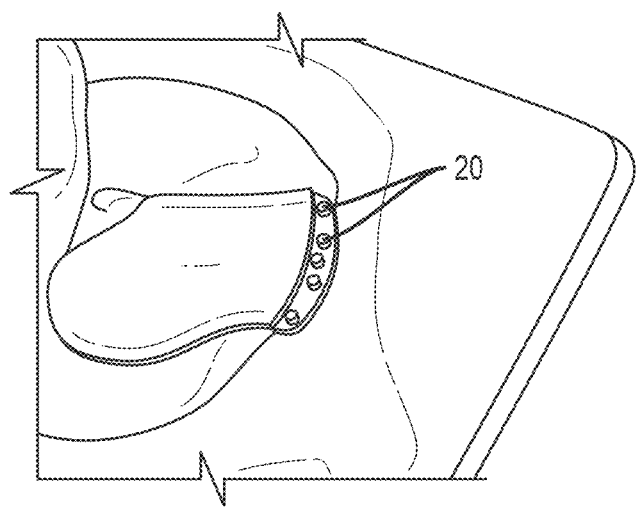
FIG. 2 shows fixation features securing the implant of FIG. 1 into place.

In a specific example, the implant 10 is made of a polyethylene material, such that the surface of a fixation device 20, such as a screw, can depress slightly into the material, in order for the screw head to remain flush, even if it would otherwise slightly protrude. This is illustrated by FIG. 2. If a surgeon does not choose to use one or more of the openings 14, it is also possible for a screw to be positioned anywhere along the extending tab 12. Tab 12 is generally less thick than the remainder of the implant body, as described further below. This thinner tab 12 can receive the fixation device even if not positioned within one of the openings 14. This is partly due to the dimensions of the tab, as well as the malleability of the polyethylene material.

Figure 3:
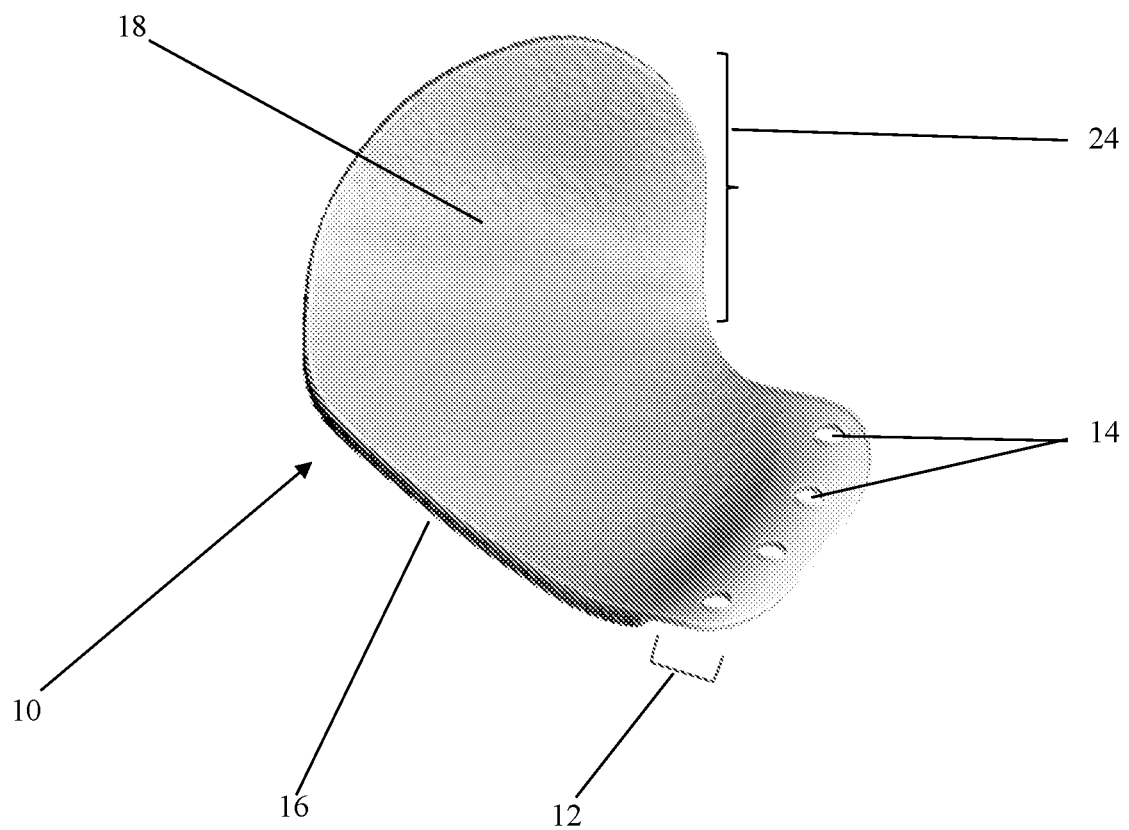
FIG. 3 shows a non-porous side of the implant of FIG. 1.
Figure 4:
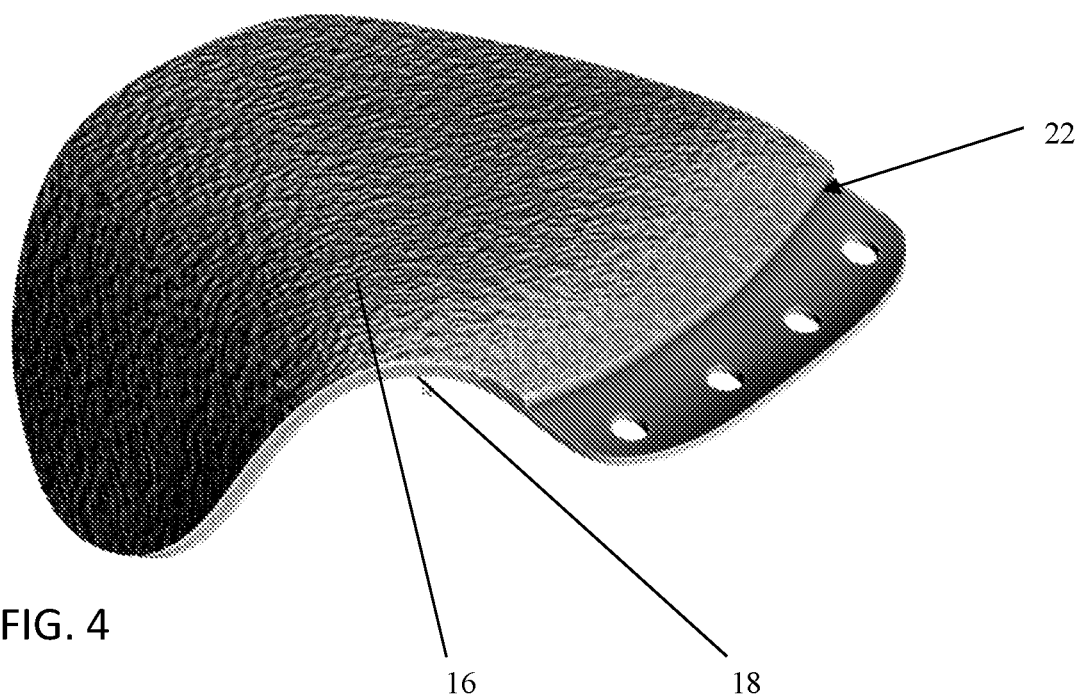
FIG. 4 shows a porous side of the implant of FIG. 1.

Referring now to FIGS. 3 and 4, the implant 10 is provided with first and second sides. One of the sides is a porous, bone-facing side 16. The other side is a non-porous, orbital-facing side 18. In use, the implant 10 is positioned with the porous bone-side layer/side 16 as the inwardly facing surface (which surface is not shown in FIG. 1, due to its inwardly-facing nature once implanted). The non-porous orbital content-side layer/side 18 faces outwardly, and this is the surface that interfaces with the patient's orbital contents. The fact that this side 18 is non-porous means that tissue and muscle integration will not occur, allowing the orbital muscles to naturally slide or otherwise move over the implant surface 18.

Figure 5:
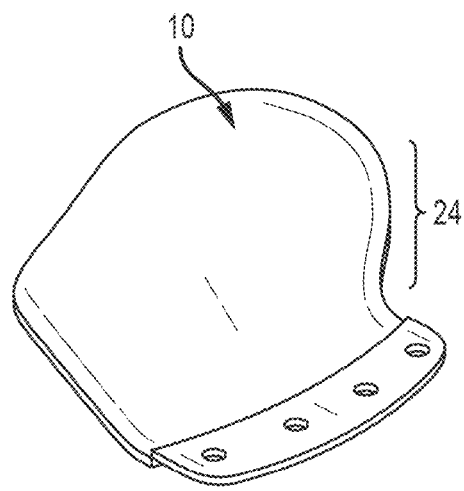
FIG. 5 shows a photo of the non-porous side of the implant of FIG. 1.
Figure 6:
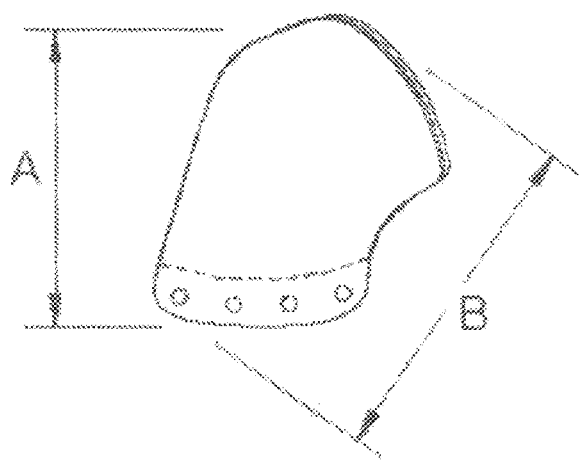
FIG. 6 shows a top perspective view of exemplary dimensions of an implant according to the disclosure.
Figure 7:
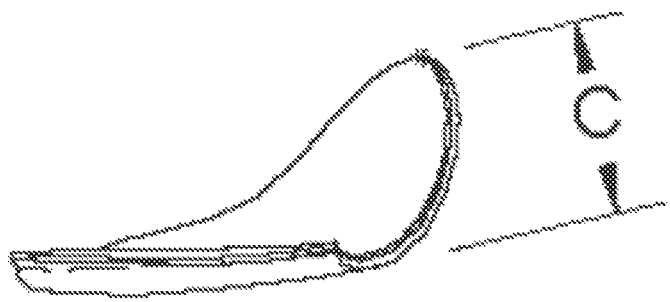
FIG. 7 shows a side perspective view of exemplary dimensions of an implant according to the disclosure.
Figure 8:
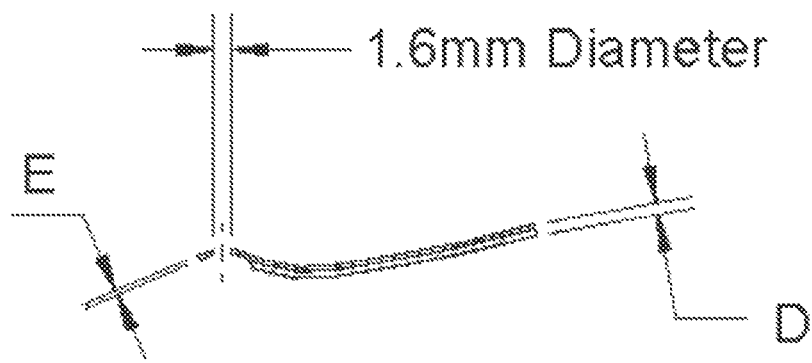
FIG. 8 shows a side plan view of exemplary dimensions of an implant according to the disclosure, with the opening illustrating one of the eyelet openings.
Figure 9:
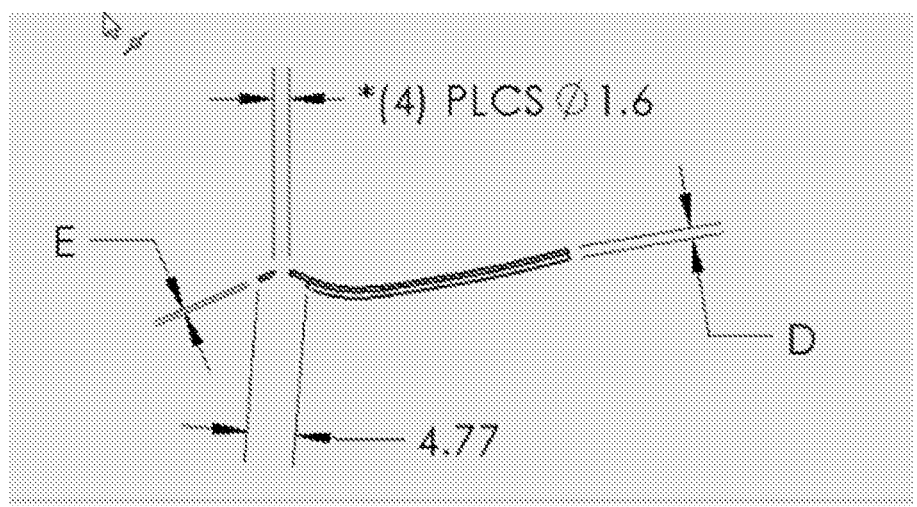
FIG. 9 shows a side plan view of exemplary dimensions of an implant according to FIG. 8, showing a distance of a transition portion.

FIG. 3 shows a perspective view illustrating the non-porous side 18 (the orbital-facing side) from a top view perspective. FIG. 4 shows a perspective view illustrating the porous side 16 (the bone-facing side) from a top perspective. FIG. 5 shows an actual photo of an implant from the non-porous side top perspective.

Referring now to FIG. 3, the non-porous side 18 extends further than the porous side 16 in order to form the extending tab 12. This extending tab 12 contours to the shape of a patient inferior orbital rim. The eyelets/openings 14 provide for intuitive ease of placement. The body of the implant is provided in an anatomical shape, as shown. This anatomical shape is preformed into the implant. This anatomical shape has an upward curvature 24, shaped to fit into the orbital opening. Although provided in a preformed shape, the implant is also bendable by hand such that the implant retains its new bent shape without the need for heating or re-heating during surgery. (This quality may be achieved by adding a temper to the polyethylene material used to form the implant in order to give the implant malleability. Multiple thermal steps may be taken during processing so that the implant may be provided with the described bendable qualities. One of the thermal steps may be processing via working the material so that it exceeds its elongated strength and then lengthening the outer surface and compressing the inner surface in order to achieve the desired malleability.)

The extending extension tab 12 has a thickness that allows it to deliver a cantilever force to the implant 10 in use. However, it is thin enough that it can receive a fixation structure 20 anywhere along the tab 20, even if not through one of the eyelet/openings 14. Where the tab 12 meets the orbital rim and when the eyelets 14 are secured, they become a point of fixation for the implant. The thickness of the non-porous side 18 can add stability and cantilever forces to the implant. In a specific example, the thickness of the non-porous side 18, including the tab 12 extending therefrom, is about 0.4 mm. It should be understood however, that a broader range is possible and considered within the scope of this disclosure. For example, the thickness may range from about 0.2 mm to about 0.6 mm in various implant options. This tab thickness has been found to provide more structural support than a typical thin barrier layer which has previously been explored. The tab 12 provides structural support for the implant in use.

Figures 10, 11:
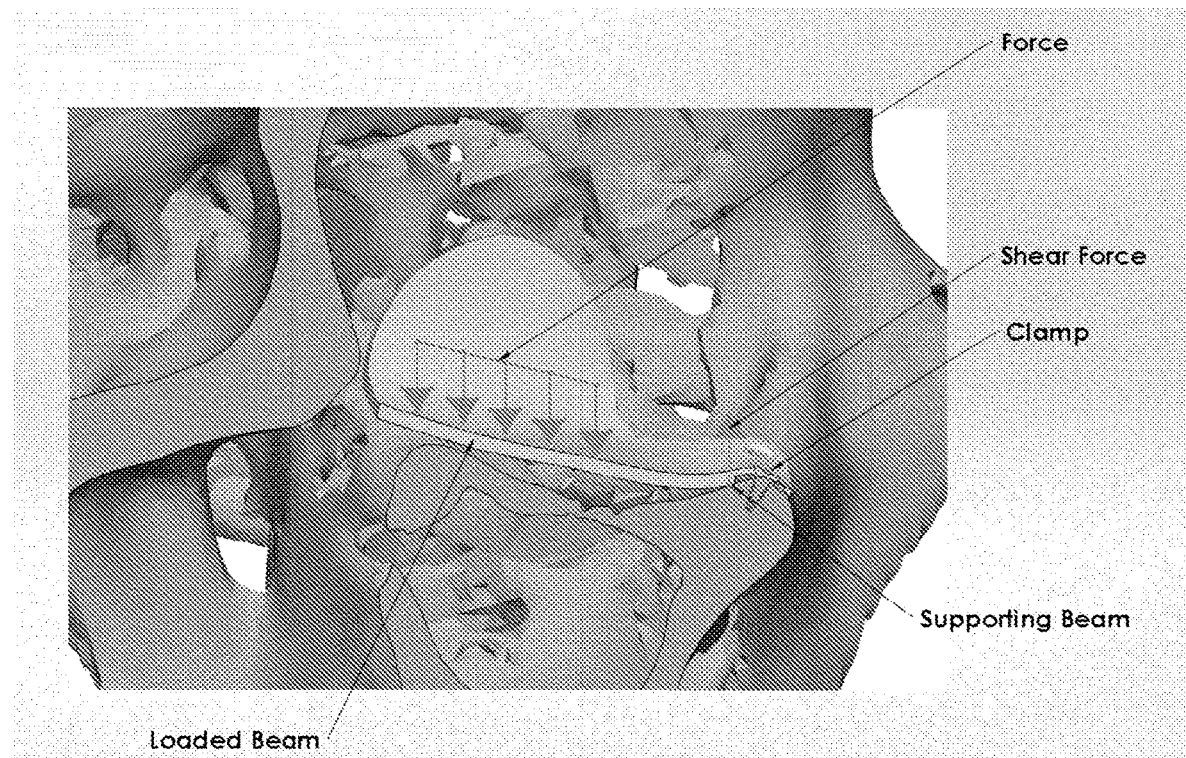
FIG. 10 shows an exemplary measurement table.
FIG. 11 shows cantilever forces of one embodiment once implanted.

FIG. 4 illustrates the porous side 16 surface, and how this side 16 is set back from the end of the non-porous side 18 in order to help form extending tab 12. This figure also shows the transition portion 22 between the porous side 16 and the non-porous side 18. This transition portion 22 is generally curved to provide a minimal transitional feel between the layers. This functions as a supporting beam. During implantation, the surgeon can maneuver the tab 12 (and if desired, bend the tab 12) to achieve the desired attachment location. There are thus two mechanical contact points: (1) the fixation elements 20 that may be positioned with respect to the tab 12 and (2) the transition portion 20, which forms a thickened area just inside the inferior rim. This edge can provide a cantilever support. The resulting cantilever force allows the body of the implant 10 to bridge the orbital defect due to the pre-shaped nature of the implant. Examples of the forces are illustrated by FIG. 11. The implant 10 has the rigidity needed in a polyethylene article in order to bridge the defect and provide necessary support.

The porous side 16 may have a thickness of about 0.6 mm. It should be understood however, that a broader range is possible and considered within the scope of this disclosure. For example the thickness may range from about 0.4 mm to about 0.8 mm. In the particularly preferred embodiment that has been explored, the non-porous side 18 has a thickness of about 0.4 mm and the porous side 16 has a thickness of about 0.6 mm. These dimensions result in an implant that is about 1.0 mm in total thickness at the posterior to rim fixation point. The tab 12 is thinner than the remainder of the implant body (formed via both the porous 16 and non-porous 18 sides) because the tab 12 does not have the porous side 16 secured thereto. Accordingly, in this example, the tab 12 has a thickness of about 0.4 mm. The porous side 16 may be provided in an anatomical shape as to better fit the patient's anatomy. This additional anatomical shape can be used to correct Enophthalmos, (low or sunken eye), or otherwise reposition the eye into a corrected location. Anterior, posterior lateral and medial corrections can be made by the porous anatomical shape, adding volume in areas where desired.

Although various possible materials may be used to manufacture the implant, it has generally been found desirable to use polyethylene or polyethylene in combination with other polymers. Polyethylene is biocompatible and can be manufactured to provide the pre-shaped, but bendable features described herein. In a specific example, high density polyethylene (HDPE) may be used. Polyethylene can be cut, trimmed, or otherwise shaped via a scalpel or surgical scissors. This is a further advantage of the use of this material. The use of polyethylene, in combination with the pre-shaped nature of the implant, provides the required strength without the use of titanium or other metal implant. Exemplary manufacturing methods are shown and described in U.S. Pat. No. 9,724,198, which is co-owned by the present assignee and incorporated herein by reference.

It is also possible to blend that polymeric material of the implant with one or more radio opaque substances in order to provide surgeon with feedback of implant position post-surgery via CT or MRI. For example, the radio opaque substance may be barium metal powder, or any other appropriate biocompatible radio opaque sub stance.

FIGS. 6-10 illustrate various dimensions for the implant. In a specific example, the eyelet openings 14 of the tab may be about 1.3, 1.4, 1.5, or 1.6 mm in diameter. This can generally correspond to the head size of a self-tapping screw. The length of the tab 12 may be about 4.5 to about 5 mm long. The body of the implant may be about 30 mm to about 34 mm in length (dimension A), depending upon the desired implant size. The total width of the body of the implant may be about 35 mm to about 38 mm in width (dimension B), depending upon the desired implant size. The upward curvature between a lower surface and an upper surface of the implant (e.g., while lying flat on a table) (dimension C) may be about 13 mm to about 16 mm, depending upon the desired implant size. The thickness of the implant body (both the porous side/layer 16 and the non-porous side/layer 18 where laminated together) (dimension D) may be about 1 mm. The thickness of the tab may be about 0.4 mm. it should be understood that these dimensions are provided for illustrative purposes only and are not intended to be limiting of the invention in any way.

FIG. 11 illustrates cantilever forces experienced by one embodiment of an implant disclosed herein, once implanted within a patient's orbital bone.

The below sections refers now to additional advantages and features of the disclosed embodiment, as well as potential implantation considerations and methods. During implantation, the remaining eyelets (e.g., any unused openings 14) can be cut in profile with a sharp instrument directly in vivo, significantly improving the transition to the patient's bone and reducing any palpable augmentation of the inferior orbital rim or orbital bone structure. Reducing the transition profile can additionally reduce risk of scar tissue adhesion. This results in a reduction in the risk of secondary surgery to elevate the attached tissue and correcting lower eyelid function and cosmesis. With the polymeric eyelets, the portion underlying the fixation screws is masked from this trimming, maintaining mechanical hold. (By contrast, during trimming of a titanium implant, the surgeon must remove the implant from the patient, make bending adjustments, remove sharp edges, and then reinsert the device. This removal and insertion action causes increased risk to the patient as the orbital contents must be elevated repeatedly to expose the orbit floor during re-introduction.) The disclosed polymeric extension tab can be modified and trimmed without removing the implant from the surgical pocket, reducing risks of unwanted retraction forces on the globe. During the surgical pocket a periosteum is incised with a monopolar cautery, a freer periosteal elevator is then used to elevate the periosteum from the orbital floor, the tissue is released from the fracture at all of its edges once tissue is released and checked for freedom of movement. The implant is then shaped to meet the size of the fracture and the implant can be placed in the sub periosteum plane. During the dissection of the orbital tissue, a tissue elevator is used. It is well-established that during this elevation of the orbital contents, excessive pressure is introduced to the globe and surrounding blood vessels, requiring elevation at only short segments of time, typically ten seconds at a time. Each time the implant is removed and replaced, this elevation of the orbital contents is required, so it has been found that minimizing this action is of high importance. As the polymeric extension allows for in-place trimming and modification, a significant reduction of orbital elevation is achieved.

With titanium mesh implants, all modifications must be conducted away from the patient. If modification of the titanium is conducted in vivo, the trimmings in the surgical site can cause a biological response in the body in the form of infection. Because the infection does not occur during surgery (but the manifestation of any infection forms after the patient has returned home), correction of this complication can require additional surgery. The disclosed porous, and non-porous polyethylene or ultra-high molecular weight polymeric material used herein does not cause this complication.

As described above and as shown in the figures, the porous portion 16 is set back a distance (from the non-porous portion 18) in order to conform to the inter volar shape of the orbit. This distance, when combined with the non-porous extension tab 12 containing fixation eyelets 14 secured to the orbital rim, produces a mechanical lever, allowing the implant 10 to extend over large open orbital floor defects where the posterior-most aspect cannot be utilized for mechanical support. In these large orbital floor defects, it is desirable to have an implant that can cantilever over an open fracture while providing enough support for the orbital contents. This is illustrated by FIG. 11.

The anatomical shape of the implant 10 provides multiple contact points in the orbit, while avoiding foramina containing arteries, veins, nerves, and muscles critical to the proper function of the orbit. The shape of the implant is also intuitive for the user, minimizing risk of incorrect placement.

Unlike titanium, the polymeric non-porous extension 12 allows for placement of fixation devices 20, such as screws and sutures, in any location along the extended area. While eyelets/opening 14 are provided to enhance intuitive use, the ability to place a fixation screw between or in any other location along the extension tab 12 is advantageous in providing additional options of fixation location.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. It should be understood that various different features described herein may be used interchangeably with various embodiments. For example, if one feature is described with respect to particular example, it is understood that that same feature may be used with other examples as well. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Changes and modifications, additions and deletions may be made to the structures and methods recited above and shown in the drawings without departing from the scope or spirit of the invention disclosure and the following claims.

The invention claimed is:

1. An orbital floor implant comprising,
   a rigid implant body defined by a porous, bone facing side and a non-porous, orbital-facing side,
   the non-porous side extending from the body to form an extension tab with one or more eyelet openings,
   a pre-shaped curved transition portion between the porous side and the non-porous side forming a thickened area at the bone-facing side that defines an inferior-rim supporting beam,
   wherein the implant comprises an upward curvature that is shaped to correspond to an orbital opening, the upward curvature extending between a lower portion of the implant to an upper portion of the implant, the upward curvature curving away from the thickened area, with a distance between the lower portion and the upper portion of the upward curvature between about 13 mm to about 16 mm.

2. The orbital floor implant of claim 1, wherein the implant comprises polyethylene material with a total implant thickness of about 1 mm.

3. The orbital floor implant of claim 1, wherein the porous side is about 0.6 mm in thickness.

4. The orbital floor implant of claim 1, wherein the non-porous side is about 0.4 mm in thickness.

5. The orbital floor implant of claim 1, wherein the extension tab has a thickness of about 0.4 mm.

6. The orbital floor implant of claim 1, wherein material forming the non-porous side that is blended with a radio opaque substance in order to provide surgeon with feedback of implant position post-surgery via CT or MRI.

7. The orbital floor implant of claim 1, wherein in use, the non-porous extension tab provides clamping force, the porous side includes the transition that functions as a supporting beam, providing shear force and supporting the remainder of the implant body which functions as a loaded beam.

* * * * *